Jan. 4, 1944. C. E. COCHRAN 2,338,097
CONTROLLER FOR INDUSTRIAL TRUCKS
Filed April 6, 1942 5 Sheets-Sheet 1
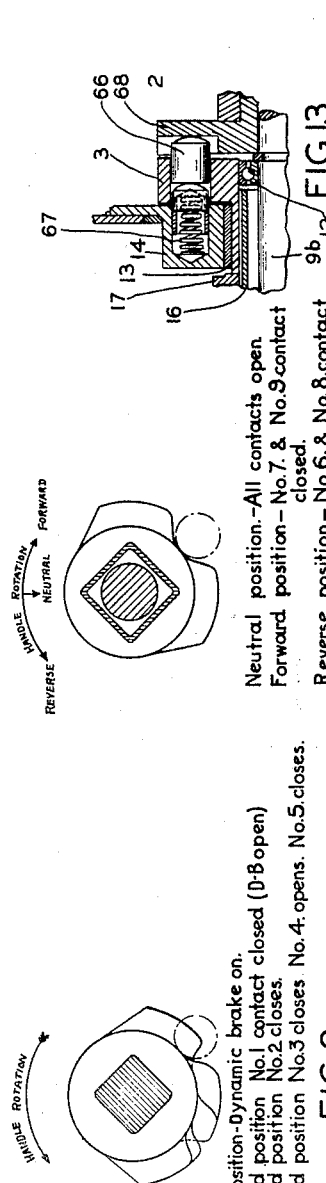
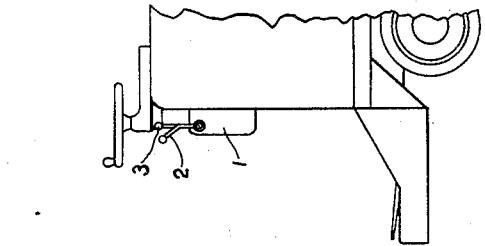
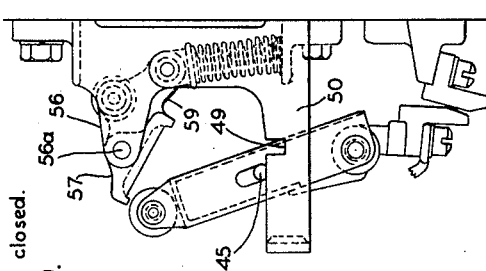
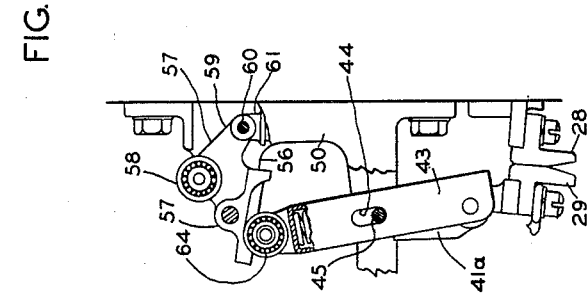
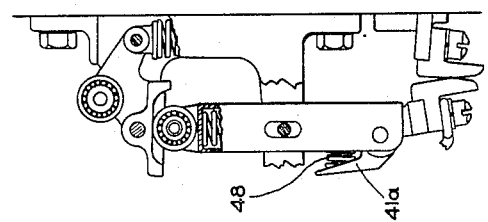
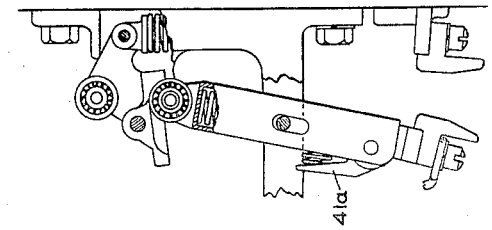
INVENTOR.
CLYDE E. COCHRAN
BY
ATTORNEYS.

Jan. 4, 1944.  C. E. COCHRAN  2,338,097
CONTROLLER FOR INDUSTRIAL TRUCKS
Filed April 6, 1942  5 Sheets-Sheet 2
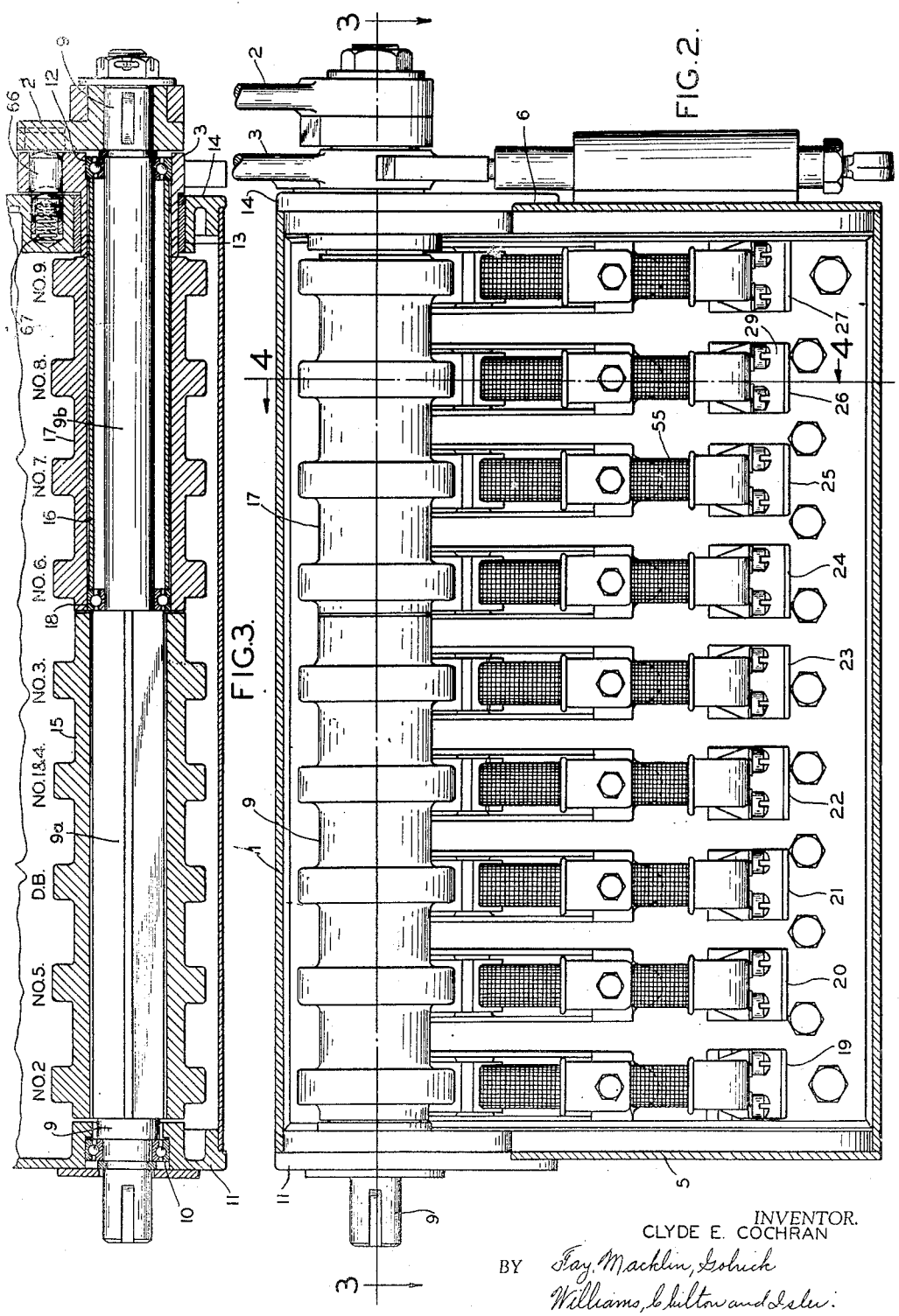
INVENTOR.
CLYDE E. COCHRAN
BY Fay, Macklin, Gohrick
Williams, Chilton and Isler
ATTORNEYS Jan. 4, 1944. C. E. COCHRAN 2,338,097
CONTROLLER FOR INDUSTRIAL TRUCKS
Filed April 6, 1942 5 Sheets-Sheet 3

INVENTOR.
CLYDE E. COCHRAN
BY Fay, Macklin, Golrick
Williams, Chilton and Isler
ATTORNEYS

Jan. 4, 1944.  C. E. COCHRAN  2,338,097
CONTROLLER FOR INDUSTRIAL TRUCKS
Filed April 6, 1942  5 Sheets-Sheet 4

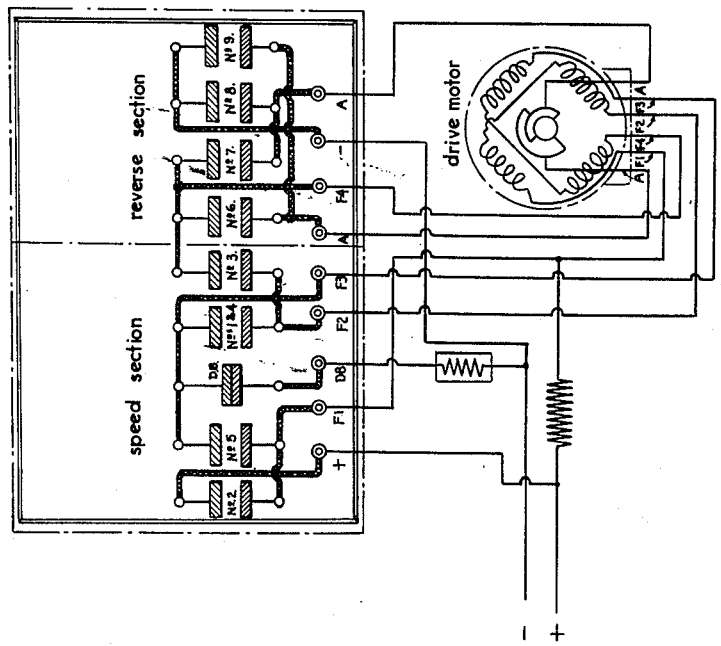

FIG. 14.

| OPERATION—SPEED. | | |
|---|---|---|
| STEP NO. 1 | FIRST SPEED | DYNAMIC BRAKE FINGER "DB" OPENS. CAM NO. 1-4 CLOSES FINGER NO. 1-4. THE FIELDS ARE THEN IN SERIES WITH ONE RESISTANCE UNIT IN SERIES WITH THEM. |
| NO. 2 | | |
| NO. 3 | SECOND SPEED | CAM NO. 2. CLOSES FINGER NO. 2. SHORTING OUT RESISTANCE. FIELDS ARE THEN IN STRAIGHT SERIES. |
| NO. 4 | | CAM NO. 3. CLOSES FINGER NO. 3. SHORTING OUT ONE-HALF THE FIELD CAM NO. 1-4. OPENS FINGER NO. 1-4. BREAKING THE SERIES CONNECTION BETWEEN FIELDS "F2" AND "F3". |
| NO. 5 | THIRD SPEED | CAM NO. 5. CLOSES FINGER NO. 5. PUTTING THE TWO HALVES OF THE FIELDS IN PARALLEL. |
| NO. 6 | | |

WHEN CONTROLLER IS IN OFF POSITION DYNAMIC BRAKE FINGER IS CLOSED COMPLETING A REGENERATIVE CIRCUIT THROUGH THE DYNAMIC BRAKE RESISTANCE, MOTOR ARMATURE AND ONE-HALF THE FIELD.

OPERATION—DIRECTION.

NEUTRAL ALL FINGERS IN REVERSE SECTION (NO'S. 6, 7, 8, 9.) IN OFF POSITION.

FORWARD FINGERS NO. 7 AND NO. 9 IN CLOSED POSITION.—NO. 6 AND NO. 8 OPEN.

REVERSE FINGERS NO. 6 AND NO. 8 IN CLOSED POSITION.—NO. 7 AND NO. 9 OPEN.

INVENTOR.
CLYDE E. COCHRAN
BY Fay, Macklin, Golrick
Williams, Chilton and Isler
ATTORNEYS.

INVENTOR.
CLYDE E. COCHRAN
BY
ATTORNEYS.

Patented Jan. 4, 1944

2,338,097

UNITED STATES PATENT OFFICE 2,338,097

CONTROLLER FOR INDUSTRIAL TRUCKS

Clyde E. Cochran, Cleveland, Ohio, assignor to The Elwell-Parker Electric Company, Cleveland, Ohio, a corporation of Ohio Application April 6, 1942, Serial No. 437,847

11 Claims. (Cl. 200—153)

This invention relates to industrial trucks and particularly to the electric controller mechanism for actuating the various functions of the truck.

A primary object of the invention is to provide a type of control for such trucks which will minimize or eliminate the disadvantages inherent in the straight resistance type of control, such as the large amount of current used up or absorbed in resistance, the resulting overheating of the controller, etc.

Another object of the invention is to provide a control of the series-series parallel top type.

A further object of the invention is to provide a controller unit of relatively simple construction, in the operation of which wear of and arcing between the contact tips is reduced to a minimum.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various structural forms in which the principle of the invention may be used.

In said annexed drawings:

Fig. 1 is a fragmentary side elevation of an industrial truck on which the invention may be used;

Fig. 2 is a front elevation of the controller, with the cover removed to more clearly show the parts within the controller housing;

Fig. 3 is a cross-sectional view, taken on the line 3—3 of Fig. 2;

Fig. 5 is a view, showing one of the contactor units in closed positions;

Fig. 6 is a view similar to Fig. 5, but showing the contactor unit in an intermediate position;

Fig. 7 is a view similar to Fig. 5, but showing the contactor unit in open position;

Fig. 8 is a view similar to Fig. 6, but showing the manner in which the movable portion of the unit may be removed from the assembly;

Fig. 9 is a view illustrating the relative position, at a given instant, of the speed drum cams;

Fig. 10 is a view illustrating the relative position, at a given instant of the reverse cam drums;

Fig. 13 is a fragmentary cross-sectional view, showing the reverse interlock in locked position;

Fig. 14 is a wiring diagram of the controller;

Figure 12:
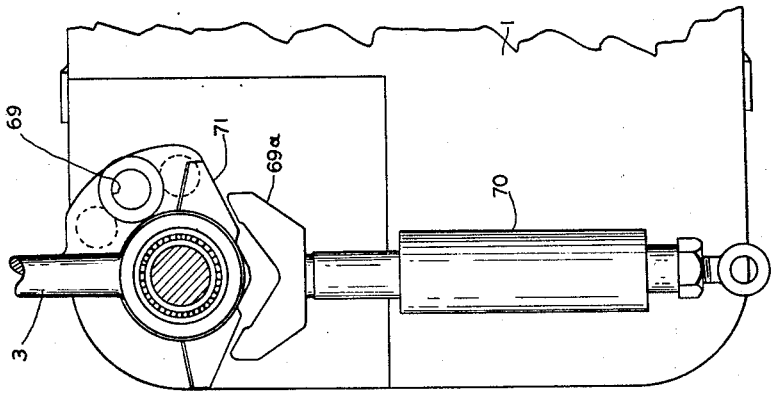
Fig. 12 is a view showing the reverse handle return mechanism.

Referring now to Fig. 1, I have illustrated as attached to an industrial truck a controller housing 1 containing the necessary mechanism for controlling the various movements of the truck. The outer control handle 2 controls the movement of the necessary contactors for actuating a series of resistances to control the relative speed of the power drive, while the inner control handle 3 controls the movement of the necessary contactors for the forward or reverse movement of the truck.

Referring now to Fig. 2, wherein is shown the controller housing with cover plate (not shown) removed to clearly show the controller mechanism, it will be seen that the controller housing 1 preferably comprises a metal stamping having a back wall 4, side or end walls 5 and 6, a top 7 and a bottom 8.

Extending across the housing is a shaft 9, one end of which is journalled in a bearing 10 mounted in a bearing support 11 secured to the end wall 5, and the other end of which is journalled in a bearing 12 mounted in the control handle 3, which in turn, is rotatably mounted in a bushing 13 secured within a bushing support 14 attached to the end wall 6 of the housing.

The shaft 9 consists of a squared portion 9a and a round portion 9b of reduced diameter. The portion 9a of the shaft has mounted thereon, so as to be rotatable therewith, a drum 15 having a series of longitudinally spaced cams formed integrally therewith, which act in a predetermined sequence, as will hereinafter be explained, to control the speed and braking of truck. For convenient reference, these cams are designated by numerals which will later be referred to in connection with a description of the operation. Rotation of the shaft 9 is effected by means of the control handle 2.

Surrounding the round portion 9b of the shaft 9 is a tubular member 16, preferably of square cross-section, but which may be of any section other than round, and which has mounted thereon, so as to be rotatable therewith, a drum 17 having a series of longitudinally spaced cams formed integrally therewith, which act in a predetermined sequence, as will hereinafter be explained, to control the forward and reverse movements of the truck. For convenient reference, these cams are designated by numerals which will later be referred to in connection with the description of the operation. The cam drum 17 is, of course, rotatable independently of the shaft 9, and to facilitate such rotation, one end of the drum is mounted on a bearing 18 which is interposed between the shaft portion 9b and the drum 17. Rotation of the drum 17 is effected by means of the control handle 3, such handle having a square socket which fits over that portion of the tubular member 16 which extends through the bushing 13.

The movement of the truck is controlled through a series of individual contactor units arranged within the housing 1. The contactor units numbered 19 to 23 inclusive are connected as shown in Fig. 2 to control the forward and reversing movements of the truck. Each of the contactor units is actuated by one of the cams which has been described, these cams being arranged in staggered relation circumferentially of their drums to provide for a predetermined timed actuation of the contactor units.

Since the contactor units are identical in construction, only one of such units need be described, the construction of such unit being best shown in Figs. 2, 4, 5, 6, 7 and 8. Such unit generally comprises a stationary contact tip 28 and a movable contact tip 29. The tip 28 is removably secured to a support 30, having a stem 31 of which extends through a vertical plate 32 of insulating material, the support 30 being secured to the bar 32 by means of a nut 33. The stem 31 has secured thereto, as by means of a nut 34, a metallic strap 35, the lower end of this strap being secured as by means of a screw 36 to a terminal plug 37, which is mounted in an insulating member 38 interposed between the bar 32 and the rear wall of the controller housing. Contact with the terminal plug 37 is made by means of a cable 39. A gasket of rubber 40 surrounds the lower end of the plug 37 and the upper end of the cable 39, and is effective to seal mechanism within the housing against the entrance of water gases or moisture at this point.

The contact tip 29 is removably secured to a support 41, which is pivotally secured as at 42, to a finger 43. The finger 43 is in the form of a hollow casing having elongated openings 44 (Fig. 5) in the sides thereof, through which extend the ends of a pin 45 mounted on a stud 46. The stud is thus slidably movable in the finger 43. A compression coil spring 47 is disposed within the finger 43, and bears at one end against the upper end of the finger and at the other end against the stud 46.

The support 41 is provided with an extension 41a, between which and the inner wall 43a of the finger 43 is interposed a coil compression spring 48.

The ends of the pin 45 project beyond the openings 44 in the finger 43 and into recesses 49 (Fig. 8) in a base or supporting bracket 50, which is secured, as by means of bolts 51 and nuts 52 to the vertical plate 32. Current is conducted to the bolt 51 and thence to the base 50 by means of a conductor 53, which is secured to the bolt 51 by means of a nut 54. Current is conducted from the contact tip 29 to the base 50 by means of a flexible copper cable 55, which is sufficiently long so that no strains are placed thereon as a result of relative movement between the tip 29 and the base 50.

The base 50 is provided with an outstanding arm 56 to which is pivotally secured as at 56a (Fig. 8) a rocker arm 57, provided with a cam roller 58 and an ear 59. Ear 59 has pivotally secured thereto as at 60 a stud 61, between which and an abutment 62 of the base 50 is interposed a compression coil spring 63. The spring 63 reacts on the arm 57 to normally maintain the roller 58 in engagement with the cam, shown in this case as cam No. 8. The finger 43 has journalled in its upper end a roller 64 which bears against a seat 65 of the rocker arm 57.

In the closed position of the contactor unit, as illustrated in Fig. 5, the upper end of the extension 41a bears against a stop 43b of the finger 43, the spring 48 is in fully compressed condition, and the upper portion of the surface of the contact tip 29 engages and is parallel with the upper portion of the surface of the contact tip 28. Moreover, the pin 45 is disposed at the lower ends of the openings 44 in the finger 43, the spring 47 is in fully extended position and the spring 63 is in fully compressed condition.

As the inner control handle 3 is moved forwardly, that is in a counter-clockwise direction, as viewed in Fig. 12, the cam (No. 8) is rotated in a counter-clockwise direction, causing the cam roller 58 to leave the projection on the cam surface and permitting the spring 63 to expand. This, in turn, causes the arm 57 to rock about its pivot in a counter-clockwise direction, and forces the finger 43 to move downwardly, as well as in a clockwise direction. This compresses the spring 47 and the slots 44 more relatively to the pin 45 so that the pin 45 occupies a position intermediate the ends of the slots, as shown in Fig. 6.

When the roller 64 and the pin 45 are vertically aligned, the pressure of the extension 41a on the spring 48 is relieved, so that the spring expands, forcing the support 41 to the position shown in Fig. 6. This is accompanied by a rocking action of the tip 29 relatively to the tip 28, as well as a slight sliding action of the tip 29 relatively to the tip 28, at the point of rocking, which conjoint action is sufficient to prevent any tendency of the tips to stick to each other or arc excessively.

Continued movement of the control handle 3 brings the parts to the fully open position shown in Fig. 7, in which position the parts are maintained until the control handle is moved in the reverse direction. The movement of the tip 29 from the position shown in Fig. 6 to that shown in Fig. 7 is a rapid one, the speed of which is so controlled as to minimize or virtually eliminate arcing.

In closing the contactor unit, the movements of the parts are reversed in order from that described.

It will be apparent from the foregoing that a true rocking action of the contact tips is secured, so that mechanical wear of the contact surface, due to sliding action, is eliminated. It will also be apparent that the quick snap action which characterizes the final separation of the movable from the stationary contact tip is calculated to reduce to a minimum impairment of the contact surfaces due to arcing.

By mounting the pins 45 in open slots 49, the fingers 43 can be easily and quickly removed in the manner shown in Fig. 8, that is by first rotating the rocker arm 57 so as to fully compress the spring 63, thereby freeing the roller 64 from its seat in the rocker arm, and then bodily lifting the finger out of the slots 49. In this way, access to the finger for inspection and replacement purposes is readily had.

In the straight resistance type of control for industrial trucks, which has been used to a great extent in the past, the construction of the controller has been fairly simple, but this type of control is characterized by a number of disadvantages. The principal disadvantage is that a considerable amount of current is consumed or absorbed in resistance, with the result that the resistances, even when of relatively great cross-section, become overheated.

The foregoing disadvantage, as well as others, is overcome by the use of the present controller, which renders possible the arrangement of a control circuit employing what may be termed a series-series parallel type of control. This circuit is diagrammatically illustrated in Fig. 14 and the operation of the circuit is described in connection with this figure.

It will be noted, with reference to Fig. 14, that the first or starting speed is accomplished by the insertion in the supply circuit of a single resistance unit, this resistance unit being simply a transition point and being therefore only momentarily in the circuit. The next step in the movement of the speed control handle short circuits this resistance unit and therefore eliminates any further dissipation of the current energy in heating resistance. The circuit is further characterized by the fact that there are two economical operating speeds or positions on the controller. The series-series parallel type of manipulation is made possible by the employment in the controller of the rocker arms 57.

The contactor designated DB, controls the dynamic brake position, i. e., a position used when the truck is going down grade or is being stopped. In this position, the battery is disconnected from the truck or electric circuit, and the motor of the truck becomes a generator. In this position, the speed control handle is in the dynamic brake position, and the reverse control handle has been moved to the opposite side of the neutral position, i. e., the armature of the drive motor has been reversed. For this purpose, only one-half of the field of the motor is used, the reason for this being one of expediency or simplicity.

In order to equalize, as much as possible, the heating effect of the current, the wiring of the motor in relation to the operation of the contactor units has been so arranged that during the transition step between the second and third speeds, and designated as No. 4, the dynamic brake portion of the field, i. e., that portion of the field which was used during dynamic braking, is momentarily short-circuited, whereas the other half of the field carries all of the current, so that the heating effect is in this way somewhat equalized for the total cycle of operation of the truck.

In bringing the truck to a stop or when attempting to reverse the direction of travel, it is impossible to do so without the application of the dynamic brake, the speed of the truck in this manner being decelerated before power for operation of the truck in the opposite direction can be applied. This prevents so-called "bucking."

Referring to Figs. 3, 12 and 13, it will be seen that an interlock mechanism is provided. In Fig. 13, the interlock pin 66 is shown in a position where the reverse drum 17 would be locked in a neutral position so that it could not again be moved into speed position until the speed drum or cam section of the controller has been returned to the off position. In Fig. 3, the interlock is shown in the off position of the controller, i. e., with both the reverse section and the speed section in the neutral or off position. In this position, it is possible for the reverse section of the controller cam assembly to be moved to either forward or reverse position freely. However, just as soon as the controller handle, which actuates the speed section of the controller cam assembly, is moved to the first speed position, the pressure of the spring 67 forces the pin 66 against the surface of the flange 68 on the reverse drum handle and if the reverse drum is in the full reverse or full forward position, the rounded end of this pin will register in the indentations shown in dotted lines in Fig. 12. These indentations serve somewhat as a starwheel and prevent the accidental return of the reverse handle to the neutral position due to vibration of the truck when passing over rough surfaces. However, should the speed section of the controller fail to return to neutral, or should the circuit in this section of the controller fail in any other way to function properly, it is only necessary for the operator to move the reverse handle back to the off position, at which time the pin 66, due to the pressure of the spring 67, will be forced into the opening 69, and in view of the fact that the speed handle will then be in a speed position, as shown in Fig. 13, the reverse drum can be moved only to the neutral position and it is not possible to move it past the neutral position and thus suddenly reverse the direction of the truck.

In Fig. 12, it will be noted that a Y-shaped or fork-shaped member 69a passes through a bearing or bracket 70 attached to the end of the controller housing. The lower end of the member 69 terminates in a rod end, which, in trucks of the type under discussion, is attached to the operator's foot pedal in such a way that should the operator leave the truck for any reason, or should he jump off the truck, a spring (not shown) forces the member 69 against the V-shaped cam 71, which is a part of the reverse handle, with sufficient energy to force the reverse handle to the neutral position and thus open the motor circuit, due to the fact that the contactors in the reverse end of the controller will be opened.

Figure 11:
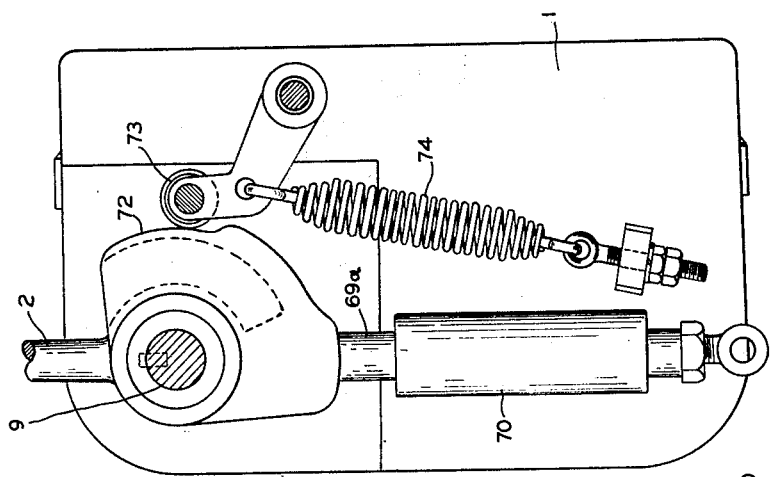
Fig. 11 is a view showing the speed handle return mechanism.
Figure 4:
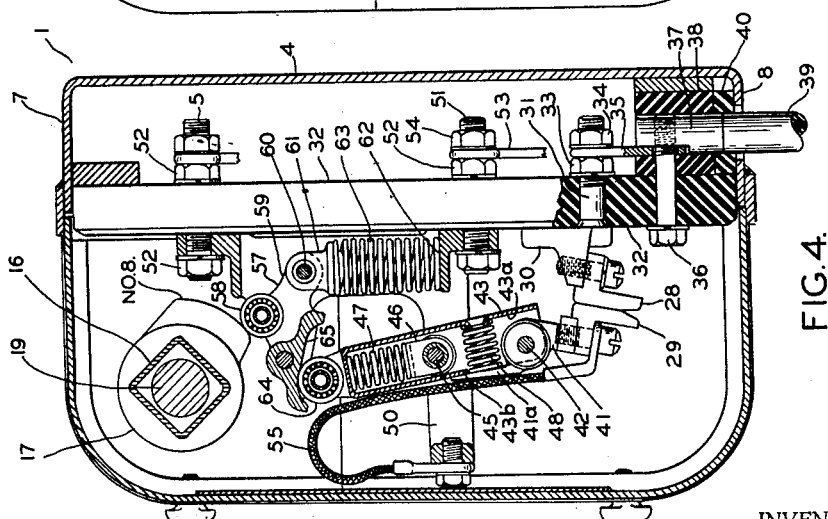
Fig. 4 is a cross-sectional view, taken on the line 4—4 of Fig. 2.

In Fig. 11, a cam 72 is shown against which a star wheel 73 bears, the pressure on this roller being controlled by means of an adjustable spring 74. This cam is a part of or is attached to the speed control lever and is keyed to the shaft 9. Movement of the speed control lever actuates the cams which control the speeds of the truck. In this view, the contactors will all be in the open position with the exception of the dynamic brake contactor which will be in the closed position. The function of the cam 72 is to insure that the speed handle will return to the off position by itself, and the hump or irregularity of the cam near the roller is for the purpose of automatically closing the dynamic brake circuit. The other section of the cam, downward and to the left, is circular, except that the center of the circle is not at the center of the shaft. In other words, when the controller is brought to full speed position, the spring 74 is stretched to the utmost, with the result that if the operator releases the handle, it will automatically rotate to the off position.

It will be noted that the controller units are mounted in an inverse position within the housing, so that the tips 28 and 29 are near the bottom of the housing, instead of at the top, as is customary. This is advantageous in that any dirt, grit or matter resulting from wear between the contact tips, will fall to the bottom of the housing, and will not interfere in any way with the operation of the units.

Figure 17:
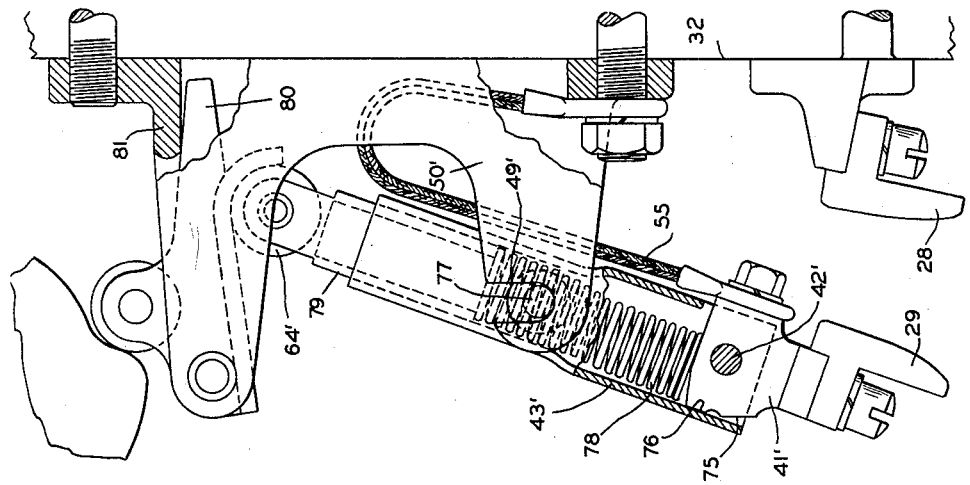
Fig. 17 is a view similar to Fig. 7, but showing the modified form of contactor unit in open position.
Figure 16:
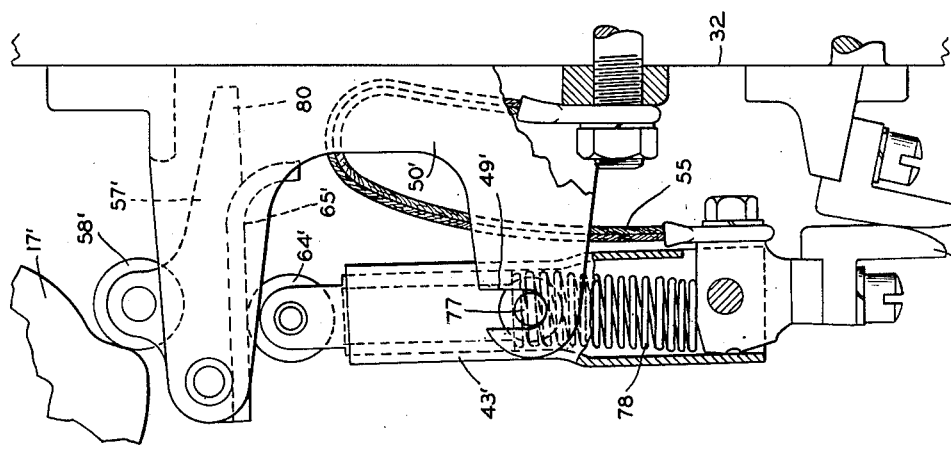
Fig. 16 is a view similar to Fig. 6, but showing the modified form of contactor unit in an intermediate position.
Figure 15:
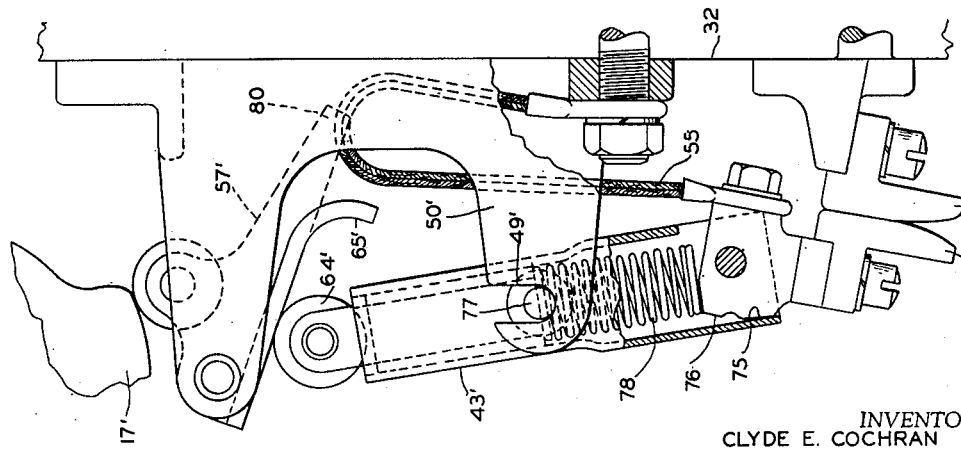
Fig. 15 is a view similar to Fig. 5, but showing a modified form of contactor unit, in closed position.

In the modified form of contactor unit shown in Figs. 15, 16 and 17, the movable contact tip has a movement substantially like that of the movable contact tip illustrated in Figs. 5, 6 and 7, but the construction of the unit has been simplified and the cost thereof considerably simplified by the elimination of a number of parts, such as two springs and several other parts.

In this construction, a hollow finger 43' is provided, which finger is open at both ends, instead of at only one end, as is the finger 43. The movable contact tip support 41', in this case, is pivoted, as at 42' to the finger 43', and is provided with two surfaces, one of which, 75, abuts the inner wall of the finger to determine the closed position of the movable contact tip, and the other of which, 76, abuts the inner wall of the finger to determine the open position of the contact tip.

The finger 43' is provided with trunnions 77 which are seated in recesses 49' in the base 50', so as to permit pivotal movement of the finger about the bearing surfaces formed by the bottoms of these recesses.

Disposed within the finger 43' is a coil spring 78, the lower end of which abuts the movable contact tip support 41', and the upper end of which abuts a cylindrical plunger 79 which is slidable within the upper and cylindrical part of the finger. The plunger 79 is provided at its upper end with a roller 64' which bears against a seat 65' of a rocker arm 57'. The rocker arm 57' is similar to the rocker arm 57, and is provided with a cam roller 58', which is maintained in engagement with the cam 17' by the pressure of the spring 78. The rocker arm 57' is provided with an extension 80, which abuts a stop 81 on the base 50' when the movable contact tip is in open position.

The construction has been further simplified by the attachment of the cable 55 directly to the movable contact tip support and to a point on the base 50' which is closely adjacent the bar 32.

It will be apparent from the foregoing description that by virtue of the relative arrangement of the spring 78 and the various pivotal centers, that a combined rocking and sliding action of the movable contact tip relatively to the stationary contact tip is obtained, in both the closing and opening of the switch, and that, in each case, the movement from the intermediate position in either direction is accompanied by a desirable snap action. In the modified construction, however, the movement of the finger is about a fixed center, and is not accompanied by an axial movement of the finger, as in the previously described form of the invention.

Having thus described my invention, I claim:

1. In an electrical controller, a support, a stationary contact tip mounted thereon, a bracket mounted on said support, a stud having a pin mounted in an open slot in said bracket, a finger enclosing said stud, a spring interposed between said finger and stud, a rocker arm engaging one end of said finger, a spring urging said rocker arm into engagement with said finger, a contact tip support pivotally mounted on said finger, and a contact tip mounted in said last-named support.

2. In an electric controller of the low potential high amperage type a quick make and break contact mechanism comprising a relatively stationary contact member of the anvil type mounted on a support, a movable contact member swingably mounted to impact against the anvil face of the stationary contact member, a lever mechanism of the second class for swingably supporting the movable contact member and arranged to swing the contact member in a non-arcuate path by a change effected in the effective arm lengths of the lever mechanism, a pivot mechanism therefor, a cam mechanism of the dead center snap over tilting type reacting upon one end of the contact lever mechanism, a spring member reacting between the pivot mechanism and the cam contacting end of the lever mechanism, an arm associated with the tiltable cam mechanism, a revolvable cam mechanism acting on said arm to tilt the tiltable cam mechanism past its dead center and spring means operatively disposed between the tiltable cam mechanism and the support for the relatively stationary contact member for shifting the tiltable cam past its dead center to thereby permit the lever mechanism to swing to a normally open contact position by a snap action.

3. In an electric controller of the low potential heavy duty type, a quick make and break contact mechanism comprising a relatively stationary contact member mounted on a support, a movable contact member swingably mounted to impact against the face of the stationary contact member, a lever mechanism for swingably supporting the movable contact member and so mounted as to swing the contact member in a non-arcuate path, a pivot mechanism for the lever mechanism, a tiltable lever actuating mechanism of the dead center snap over tilting type reacting upon the lever mechanism, a spring member reacting between the pivot mechanism of the lever mechanism and the tiltable lever actuating mechanism, an arm associated with the lever actuating mechanism, a revolvable cam mechanism acting on said arm to tilt the lever actuating mechanism and spring means operatively disposed between the lever actuating mechanism and said support for shifting the tiltable lever actuating mechanism and the lever mechanism past their relative dead center positions to thereby permit the lever mechanism to swing to a normally open contact position by a snap action.

4. In an electric controller of the low potential high amperage type, a quick make and break contact mechanism comprising a relatively stationary contact member of the anvil type mounted on a support, a movable contact member swingably mounted to impact against the anvil face of the stationary contact member, a lever mechanism of the second class for swingably supporting the movable contact member and arranged to swing the contact member in a non-arcuate path by a change effected in the arm lengths of the lever mechanism during the operation thereof, a pivot mechanism for the lever mechanism, a cam mechanism of the dead center snap over tilting type reacting upon one end of the contact lever mechanism, a spring member interposed between the pivot mechanism and the cam contacting end of the lever mechanism, an arm associated with the tiltable cam mechanism, a revolvable cam mechanism acting on said last-named arm to tilt the tiltable cam mechanism past its dead center and spring means operatively disposed between the tiltable cam mechanism and the stationary contact support for shifting the tiltable cam past its dead center to thereby permit the lever mechanism to swing to a normally open contact position by a snap action.

5. In an electric controller of the low potential high amperage capacity type, a quick make and break contact mechanism comprising a relatively stationary contact member mounted on a support, a contact member swingably mounted to impact against the stationary contact member, a swing over dead center lever mechanism supporting the movable contact member and arranged to swing the contact member in a non-arcuate path by a change effected in the operating length of the lever mechanism, a pivot mechanism for the lever mechanism, a cam mechanism of the dead center snap over lever tilting type reacting upon one end of the lever mechanism, a spring member reacting between the pivot mechanism and the cam contacting end of the lever mechanism, a revolvable cam mechanism acting on the tiltable cam mechanism to shift it past dead center in one direction to close the contacts with a snap action and spring means operatively disposed between the tiltable cam mechanism and said support for shifting the tiltable cam past its dead center in a direction opposite to said first direction to thereby cause the lever mechanism to swing the movable contact to an open position with a snap action.

6. In an electrical controller, a support, a stationary contact tip mounted thereon, a bracket mounted on said support, a rocker arm pivotally mounted on said bracket, a cam engaging said rocker arm, a finger pivotally movable relatively to said bracket, a movable contact tip, a support for said movable tip pivotally connected to said finger, a plunger within said finger, a roller secured to said finger and in engagement with said rocker arm, and spring means interposed between said plunger and said movable contact tip support.

7. In an electrical controller, a stationary contact tip, a stationary bracket, a hollow finger pivotally mounted on said bracket, a member reciprocably movable in said finger, a movable contact tip, a support for said movable tip pivotally mounted on said finger, and spring means interposed between said support and said reciprocable member, said movable finger being rockable in response to yielding pressure exerted by said reciprocable member upon said spring.

8. In an electrical controller, a bracket, a finger pivotally mounted on said bracket, said finger comprising a portion of cylindrical cross-section and a portion of enlarged cross-section, a plunger mounted in said first-named portion of the finger, a contact tip support pivotally mounted in the enlarged portion of the finger and a coil spring interposed between said plunger and support, said coil spring being distortable in a direction angular to its axis within the enlarged portion of the finger.

9. In a controller of the type described, a stationary contact tip, a bracket, recesses in said bracket, a hollow casing having pins extending therefrom mounted in said recesses, said mounting permitting removal of said casing from said bracket without the aid of tools, and a movable contact tip supported by said casing.

10. In a controller of the type described, a stationary contact tip, a bracket, recesses in said bracket, a hollow casing having elongated slots in the sides thereof, a stud slidably movable in said casing, pins mounted on said stud and extending through said slots and into said recesses, and a movable contact tip supported by said casing.

11. In a controller of the type described, a stationary contact tip, a bracket, recesses in said bracket, a hollow casing having elongated slots in the sides thereof, a stud slidably movable in said casing, a coil spring interposed between one end of said casing and said stud, pins mounted on said stud and extending through said slots and into said recesses, and a movable contact tip supported by said casing.

CLYDE E. COCHRAN.